United States Patent [19]
Hanesworth

[11] Patent Number: 5,918,904
[45] Date of Patent: Jul. 6, 1999

[54] SNAP ON MUD FENDERS FOR MOUNTAIN BIKES

[76] Inventor: Don Hanesworth, 1212 34th St., Bellingham, Wash. 98226

[21] Appl. No.: 08/767,145

[22] Filed: Dec. 16, 1996

[51] Int. Cl.⁶ ..................................................... B62B 9/16
[52] U.S. Cl. ....................................... 280/852; 280/152.1
[58] Field of Search ..................................... 280/852, 851, 280/847, 152.1, 152.2, 152.3, 160.1

[56] References Cited

U.S. PATENT DOCUMENTS

| | | | |
|---|---|---|---|
| 520,245 | 5/1894 | Rudy | 280/152.3 |
| 544,935 | 8/1895 | Shone | 280/152.3 |
| 558,938 | 4/1896 | Fletcher et al. | 280/152.2 |
| 590,980 | 10/1897 | Hall | 280/152.3 |
| 5,120,073 | 6/1992 | Sealy, Jr. | 280/152.1 |
| 5,121,935 | 6/1992 | Mathieu et al. | 280/152.3 |
| 5,716,070 | 2/1998 | Pearson | 280/852 |

*Primary Examiner*—Robert J. Oberleitner
*Assistant Examiner*—Avraham H. Lerner

[57] ABSTRACT

New Snap on Mud Fenders for Mountain Bikes for offering an easier attachment for quick installation. In use, when racing mountain bikes, the ground conditions can some times be wet and muddy and fenders on a bicycle 1 can some times assist the rider, helping them to go faster. In this event, it is desirable to be able to recognize these conditions ahead of the start of a race, and to be able to react quickly by installing fenders. The front fender 20 is clipped onto the bicycle's tubular frame and the rear fender is simply inserted under the bicycle seat.

10 Claims, 9 Drawing Sheets

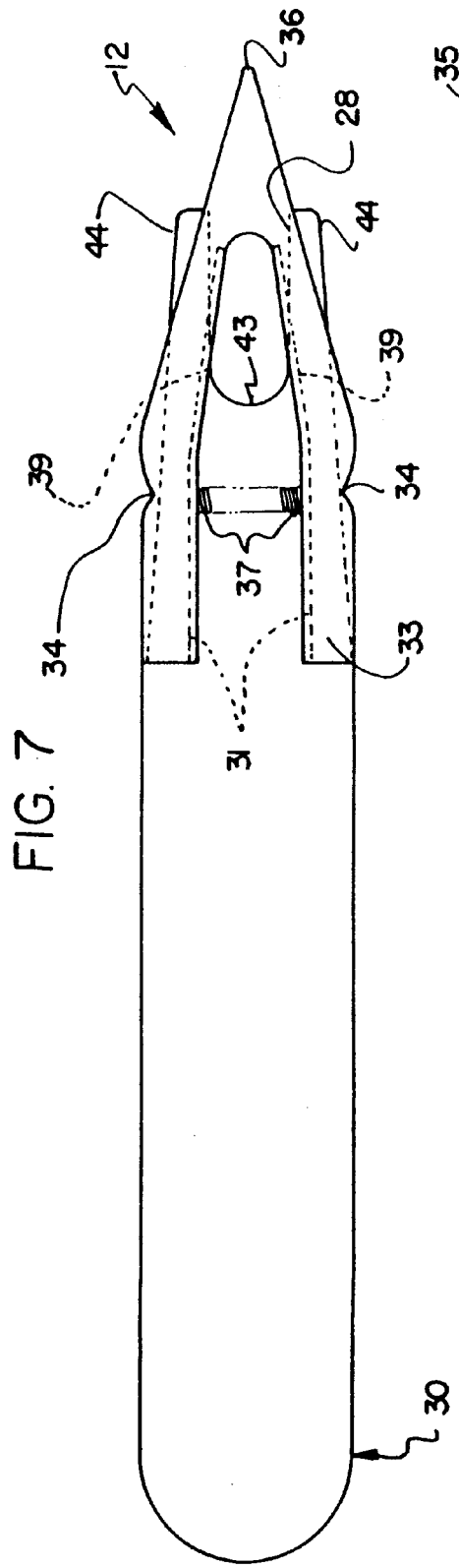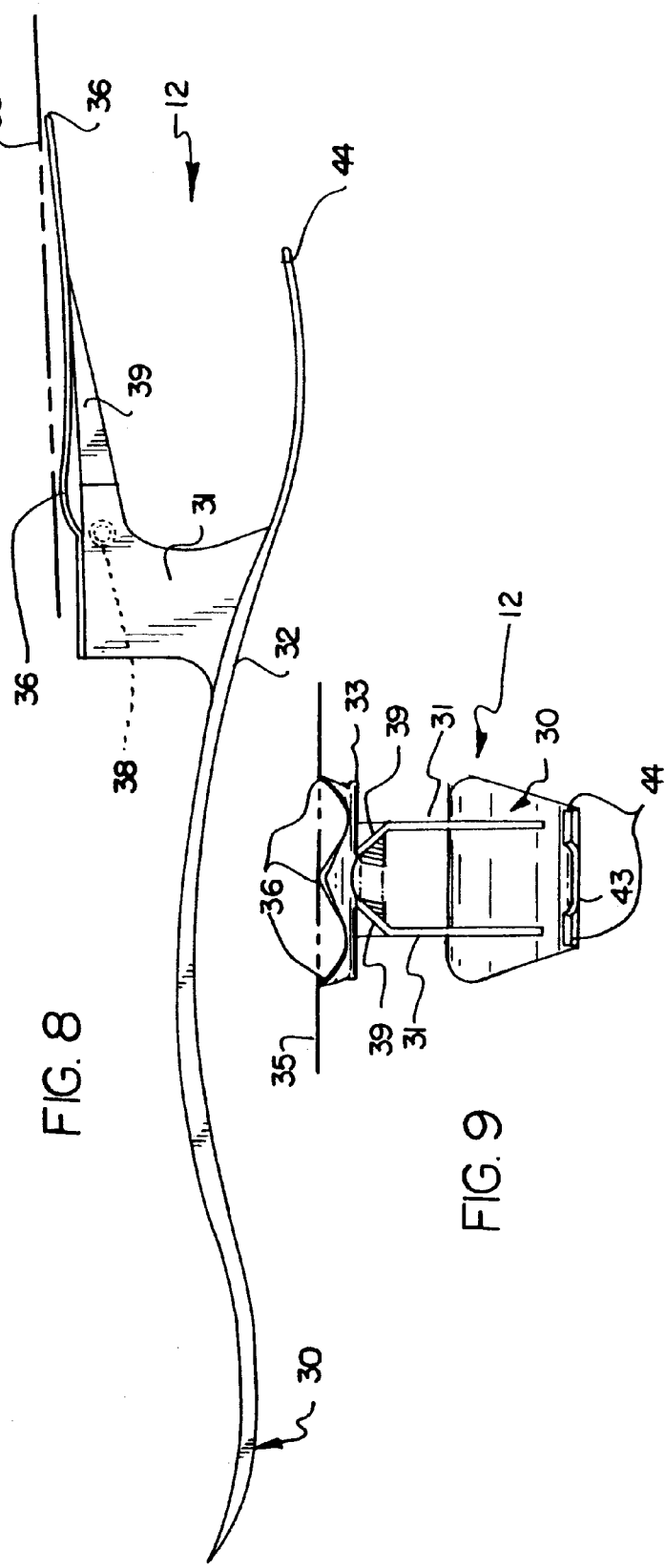

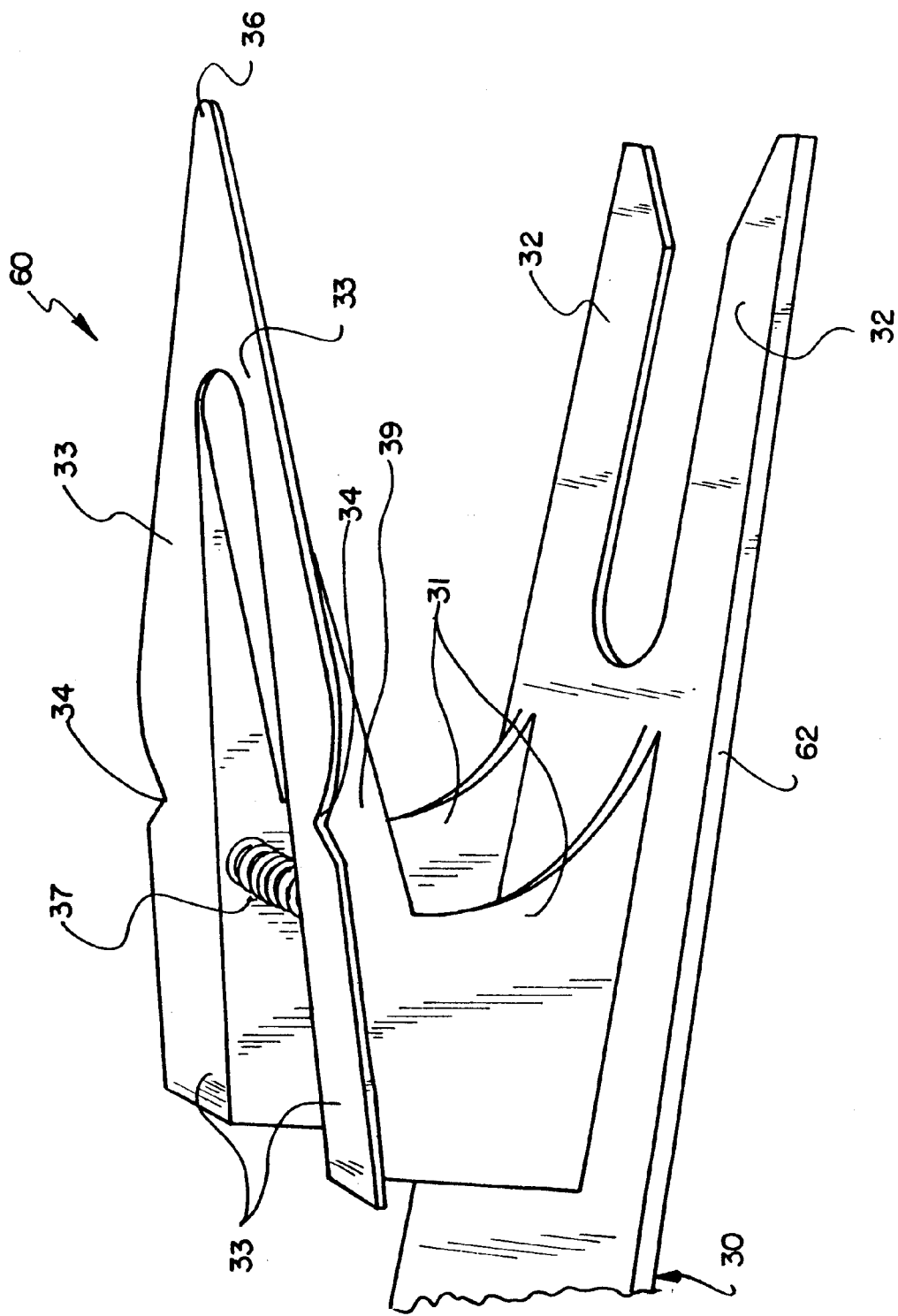

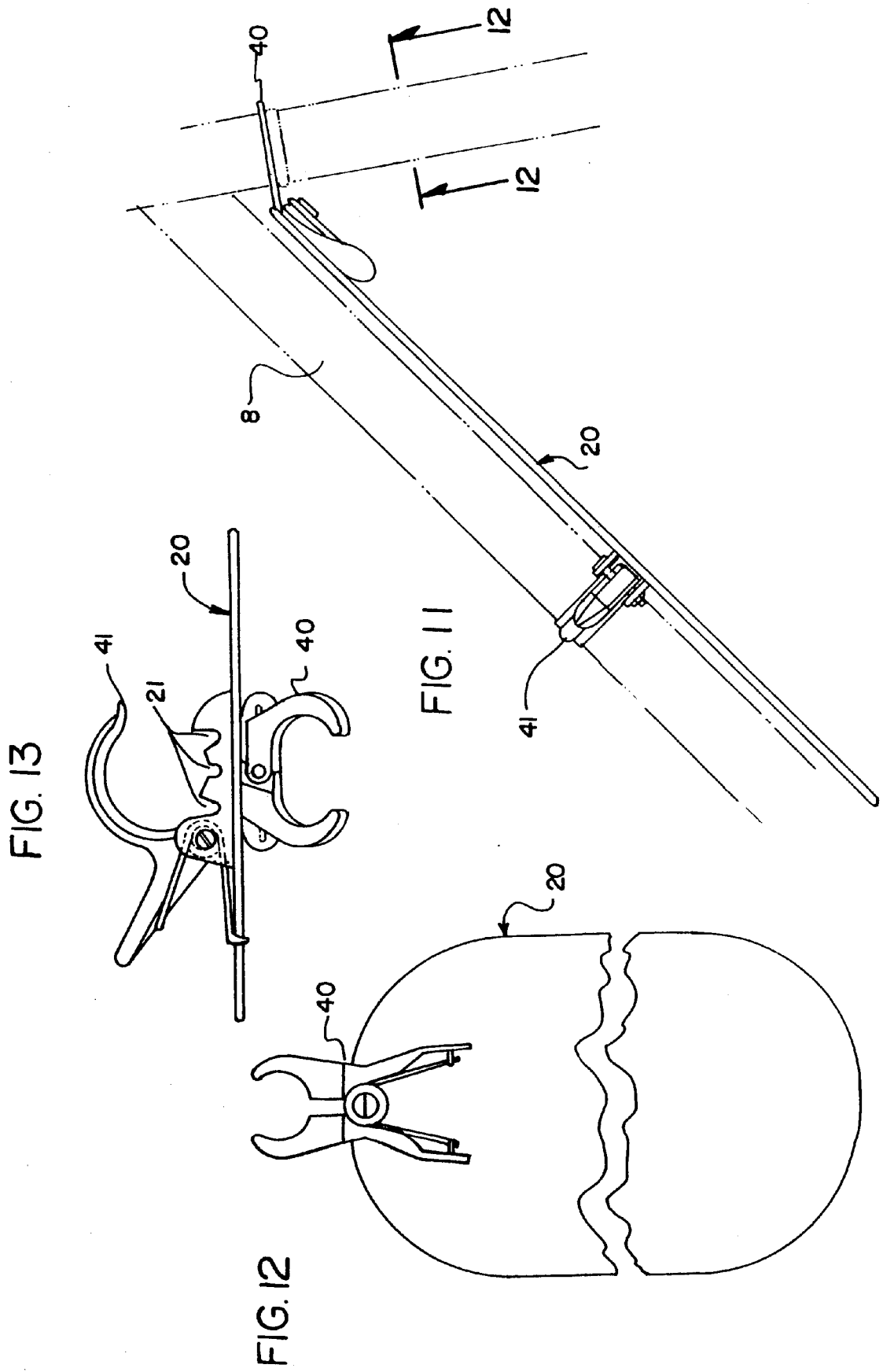

SNAP ON MUD FENDERS FOR MOUNTAIN BIKES

BACKGROUND OF THE INVENTION

1. Field of the Invention

The present invention relates to Bicycle Fenders and more particularly pertains to new Snap on Mud Fenders for Mountain Bikes for offering an easier attachment for quick installation.

2. Description of the Prior Art

The use of Bicycle Fenders is known in the prior art. More specifically, Bicycle Fenders heretofore devised and utilized are known to consist basically of familiar, expected and obvious structural configurations, notwithstanding the myriad of designs encompassed by the crowded prior art which have been developed for the fulfillment of countless objectives and requirements.

Known prior art Bicycle Fenders include U.S. Pat. No. 4,319,763 issued to White on Mar. 16, 1982; U.S. Pat. No. 5,121,935 issued to Mathieu et al. on Jan. 16, 1992; U.S. Patent Des. 325,367 issued to Cottel on Apr. 14, 1992; U.S. Pat. No. 5,120,073 issued to Sealy, Jr. on Jun. 9, 1992; U.S. Pat. No. 5,275,427 issued to Gasser on Jan. 4, 1994; U.S. Pat. No. 5,354,082 issued to Tsai on Oct. 11, 1994; U.S. Pat. No. 5,112,071 issued to Jones on May 12, 1992; and U.S. Patent Des. 316,995 issued to Kowalski on May 21, 1991.

While these devices fulfill their respective, particular objectives and requirements, the aforementioned patents do not disclose a new Snap on Mud Fenders for Mountain Bikes. The inventive device includes a front fender and a rear fender having at least one support clip.

In these respects, the Snap on Mud Fenders for Mountain Bikes according to the present invention substantially departs from the conventional concepts and designs of the prior art, and in so doing provides an apparatus primarily developed for the purpose of offering an easier attachment for quick installation.

SUMMARY OF THE INVENTION

In view of the foregoing disadvantages inherent in the known types of Bicycle Fenders now present in the prior art, the present invention provides a new Snap on Mud Fenders for Mountain Bikes construction wherein the same can be utilized for offering an easier attachment for quick installation.

The general purpose of the present invention, which will be described subsequently in greater detail, is to provide a new Snap on Mud Fenders for Mountain Bikes apparatus and method which has many of the advantages of the Bicycle Fenders mentioned heretofore and many novel features that result in a new Snap on Mud Fenders for Mountain Bikes which is not anticipated, rendered obvious, suggested, or even implied by any of the prior art Bicycle Fenders, either alone or in any combination thereof.

To attain this, the present invention generally comprises a front fender and a rear fender having at least one support clip.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Snap on Mud Fenders for Mountain Bikes apparatus and method which has many of the advantages of the Bicycle Fenders mentioned heretofore and many novel features that result in a new Snap on Mud Fenders for Mountain Bikes which is not anticipated, rendered obvious, suggested, or even implied by any of the prior art Bicycle Fenders, either alone or in any combination thereof.

It is another object of the present invention to provide a new Snap on Mud Fenders for Mountain Bikes which may be easily and efficiently manufactured and marketed.

It is a further object of the present invention to provide a new Snap on Mud Fenders for Mountain Bikes which is of a durable and reliable construction.

An even further object of the present invention is to provide a new Snap on Mud Fenders for Mountain Bikes which is susceptible of a low cost of manufacture with regard to both materials and labor, and which accordingly is then susceptible of low prices of sale to the consuming public, thereby making such Snap on Mud Fenders for Mountain Bikes economically available to the buying public.

Still yet another object of the present invention is to provide a new Snap on Mud Fenders for Mountain Bikes which provides in the apparatuses and methods of the prior art some of the advantages thereof, while simultaneously overcoming some of the disadvantages normally associated therewith.

Still another object of the present invention is to provide a new Snap on Mud Fenders for Mountain Bikes for offering an easier attachment for quick installation.

Yet another object of the present invention is to provide a new Snap on Mud Fenders for Mountain Bikes which includes a front fender and a rear fender having at least one support clip.

Even still another object of the present invention is to provide a new Snap on Mud Fenders for Mountain Bikes wherein the snaps can be adjusted for tightness and where the rear fender can be adjusted to accept a wide variety of bicycle sizes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a plan view of a rear fender and a seat attachment means according to the present invention.

FIG. 8 is a side elevation view of a rear fender and a seat attachment means according to the present invention.

FIG. 9 is a front elevation view of a rear fender and a seat attachment means according to the present invention.

FIG. 10 is a perspective view of a rear fender and a seat attachment means according to the present invention.

FIG. 11 is a side elevation view of a front fender according to the present invention.

FIG. 12 is a cross sectional view taken along line 12—12 of FIG. 11 according to the present invention.

FIG. 13 is a front elevation view of a front fender according to the present invention.

DESCRIPTION OF THE PREFERRED EMBODIMENT

Figure 1:
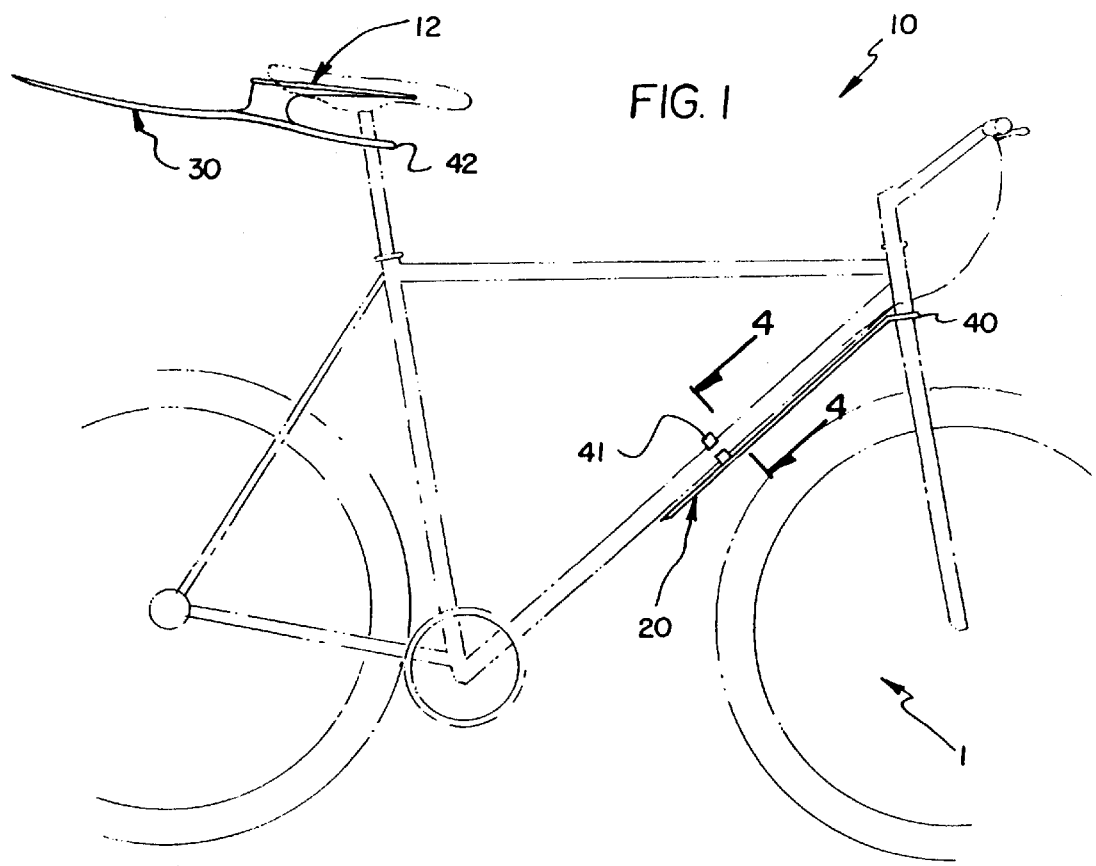
FIG. 1 is a side elevation view of a preferred embodiment of a new Snap on Mud Fenders for Mountain Bikes according to the present invention.
Figure 2:
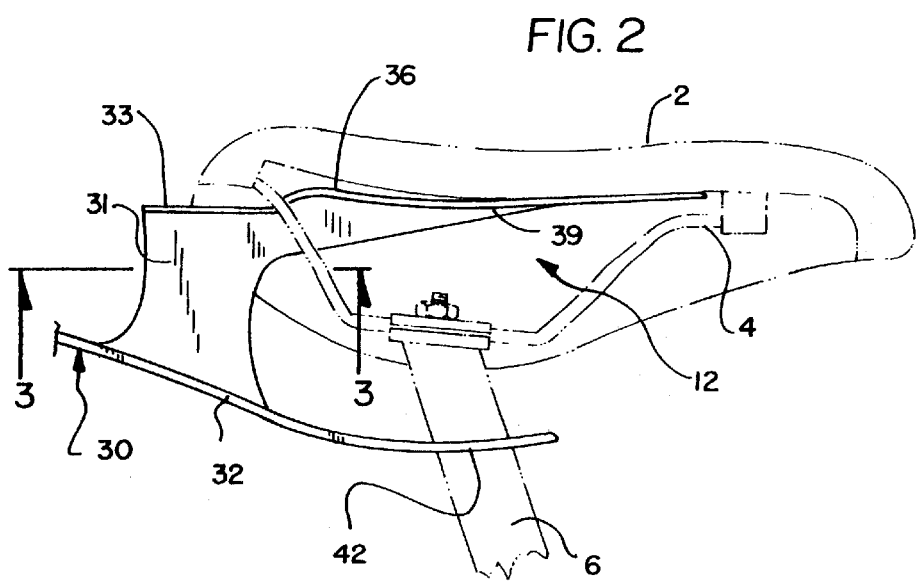
FIG. 2 is an enlarged side elevation view of a rear fender according to the present invention.
Figure 3:
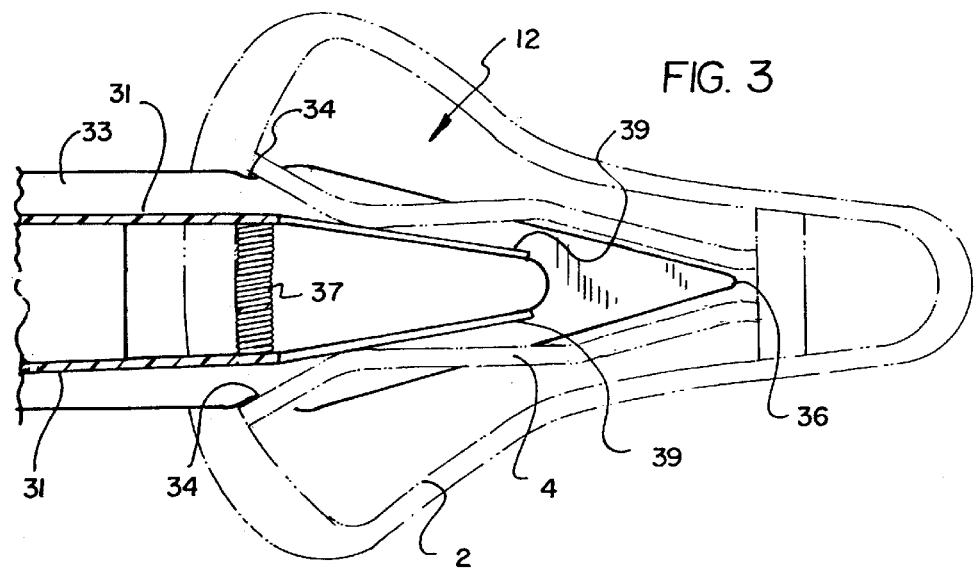
FIG. 3 is a bottom cross sectional view of a seat attachment means according to the present invention.
Figure 4:
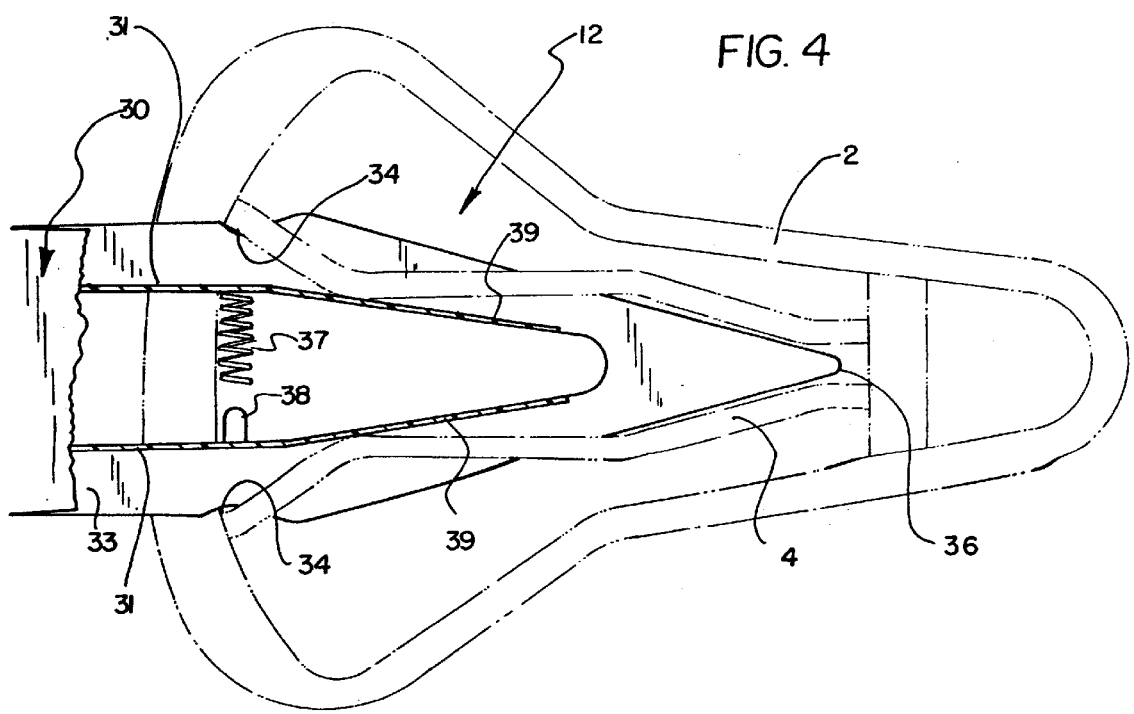
FIG. 4 is a bottom cross sectional view of a seat attachment means and a spring stud according to the present invention.
Figure 5:
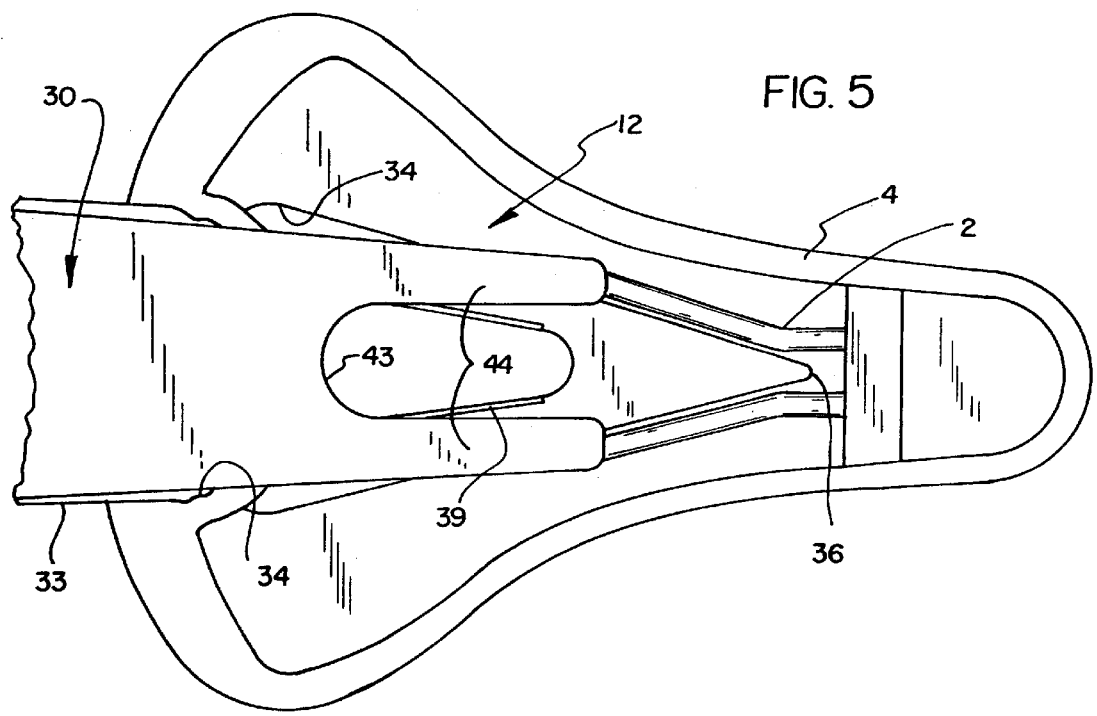
FIG. 5 is a bottom cross sectional view of a rear fender according to the present invention.
Figure 6:
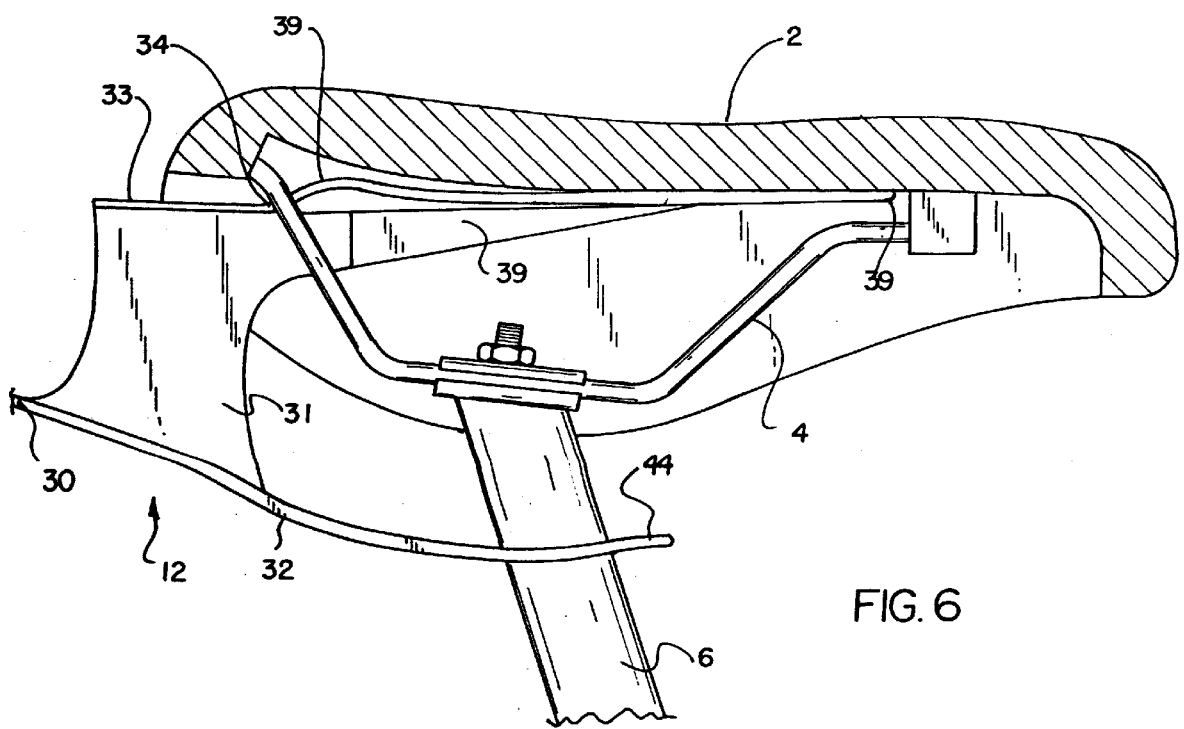
FIG. 6 is a side elevation cross sectional view of a seat attachment means according to the present invention.
Figure 14:
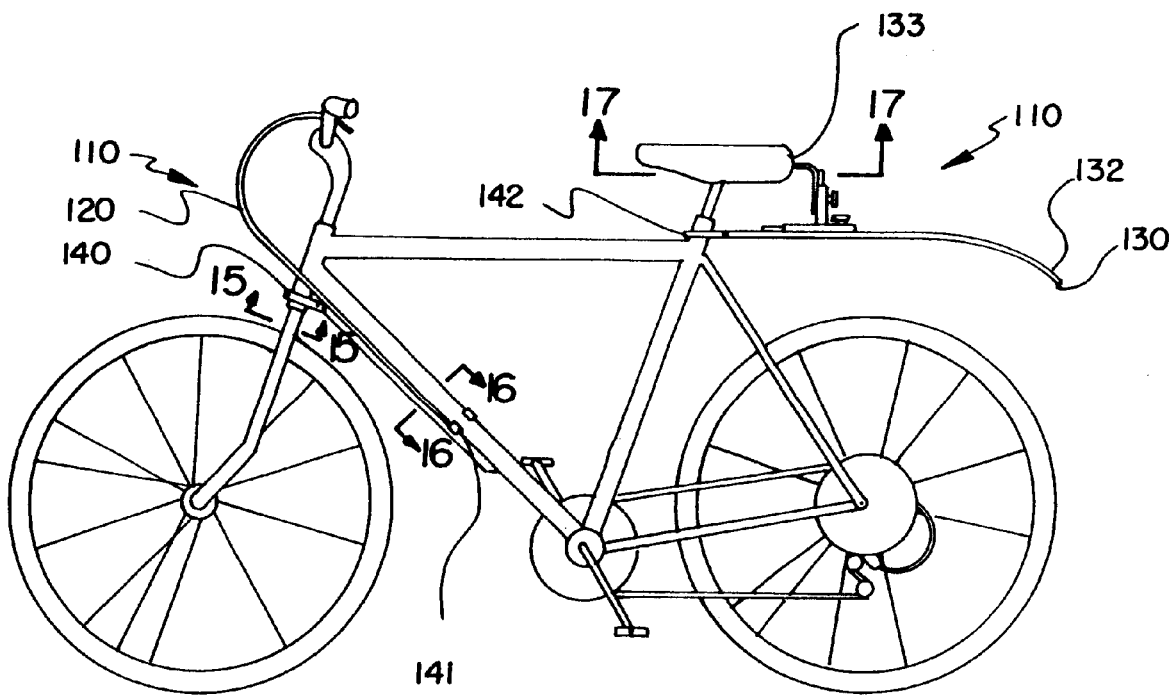
FIG. 14 is a side elevation view of a new Snap on Mud Fenders for Mountain Bikes according to the present invention.
Figure 15:
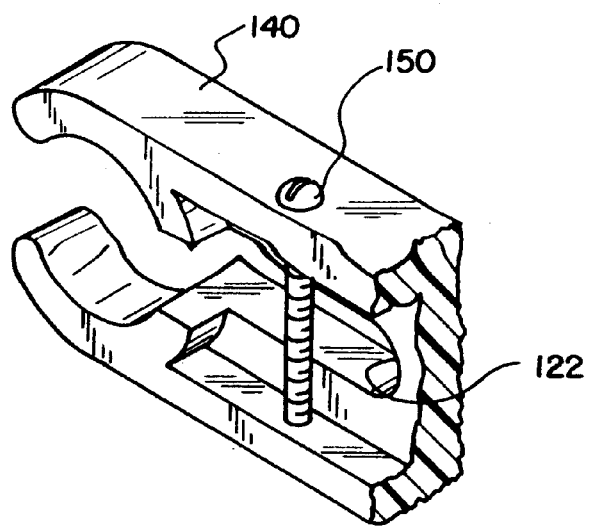
FIG. 15 is a cross section view taken along line 15—15 of FIG. 14 of a front fender clip.
Figure 16:
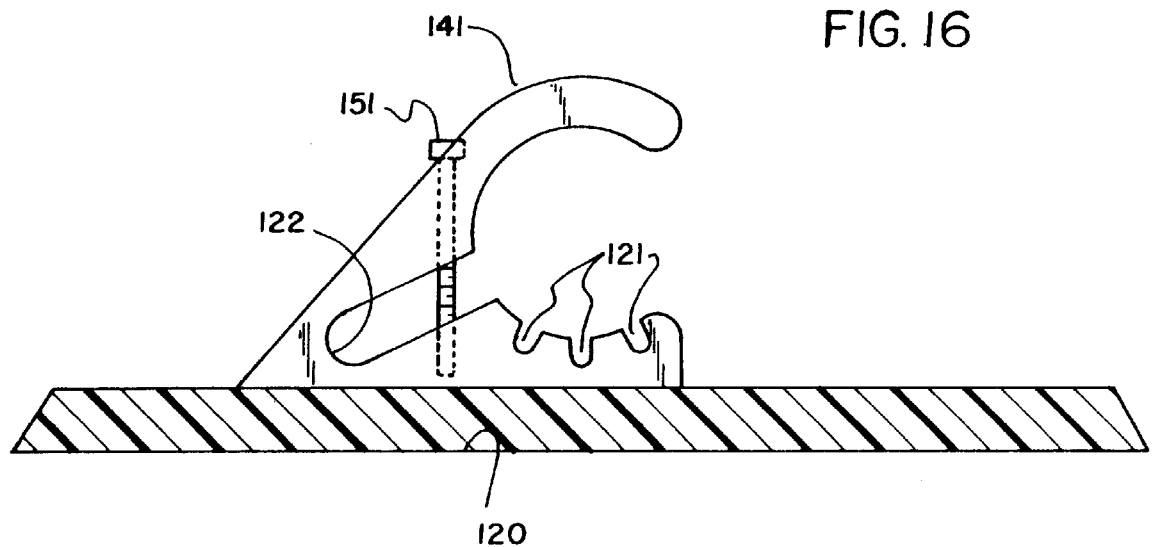
FIG. 16 is a cross section view taken along line 16—16 of FIG. 14 of a front fender frame clip.
Figure 17:
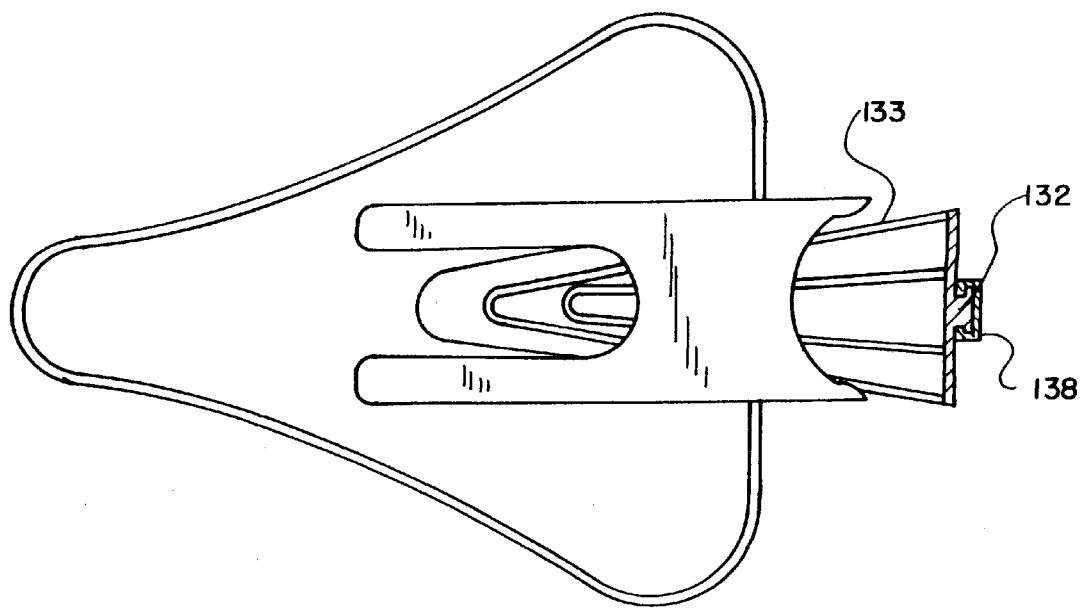
FIG. 17 is a bottom view taken along line 17—17 of FIG. 14 of a seat bottom and a seat connector.
Figure 18:
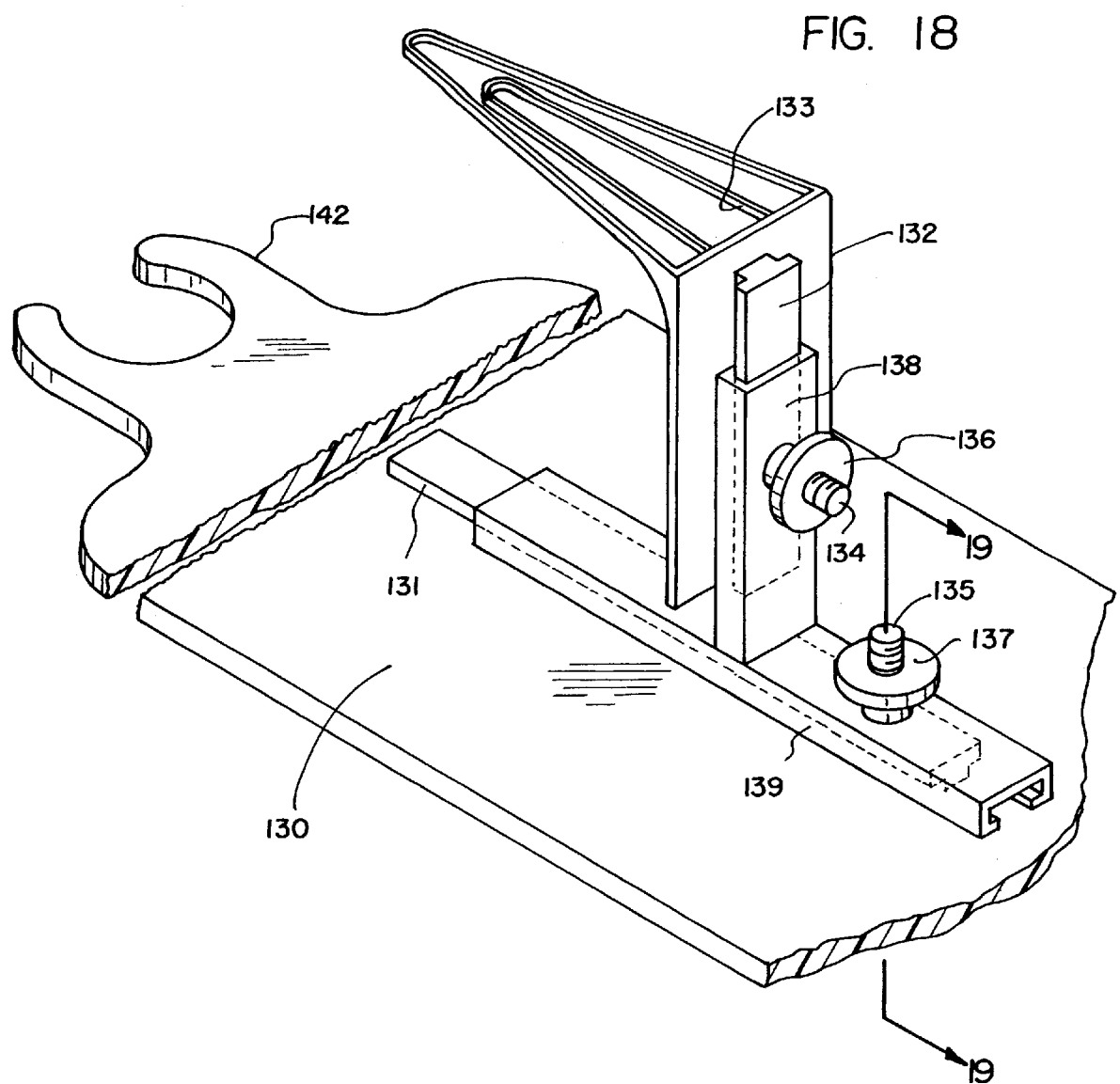
FIG. 18 is an enlarged cross sectional view of a vertical and horizontal seat adjustment.
Figure 19:
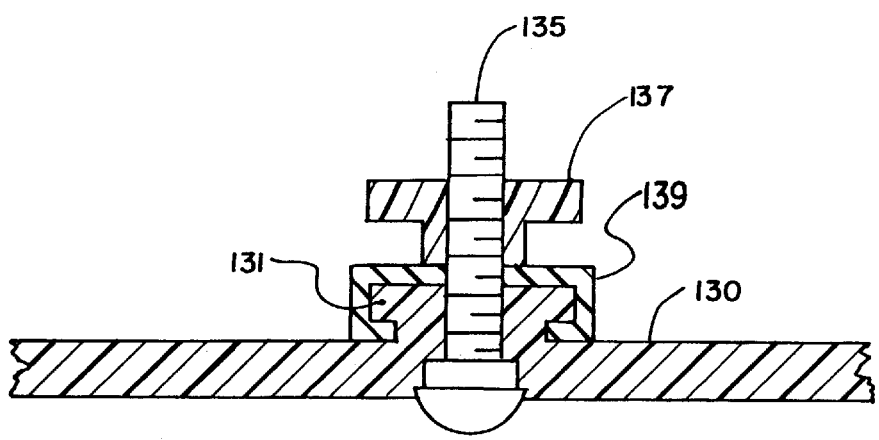
FIG. 19 is an enlarged cross sectional view taken along line 19—19 of FIG. 18 of a rear fender horizontal seat adjustment.

With reference now to the drawings, and in particular to FIGS. 1 through 19 thereof, of a new Snap on Mud Fenders for Mountain Bikes embodying the principles and concepts of the present invention and generally designated by the reference numeral 10 will be described.

More specifically, it will be noted that a basic embodiment of the Snap on Mud Fenders for Mountain Bikes 110 comprises a front fender 120 and a rear fender 130 where in the front fender 120 is held on by a front fender clip 140 and a frame clip 141 and the rear fender 130 is held on by a rear fender clip 142 and a seat connector 133.

As best illustrated in FIGS. 14 through 19, it can be shown that the front fender clip 140 and the frame clip 141 each have a recess 122. The recess 122 together with a front fender clip screw 150 allow the front fender clip 140 to be adjusted for tightness and likewise a recess 122 together with a frame clip screw 151 allow the frame clip 141 to be adjusted for tightness. Furthermore, the frame clip 141 further includes cable slots 121 which allow it to fit over existing brake cables and the like. The rear fender 130 is supported by a rear fender clip 142 and a seat connector 133 which further includes a vertical slide adjustment 132 which is set to accommodate taller bicycles by a vertical set screw 134 and a vertical set screw nut 136 which hold a vertical slide bracket 138 in relative position to the vertical slide adjustment 132, and a horizontal slide adjustment 131 which is set to accommodate longer bicycles by a horizontal set screw 135 and a horizontal set screw nut 137 which hold a horizontal slide bracket 139 in relative position to the horizontal slide adjustment 131. The horizontal slide adjustment 131 is fastened to and is an extension of the rear fender 130 and the vertical slide adjustment 132 is fastened to and is an extension of the seat connector 133.

In use, the front fender 120 is adjusted to fit the bicycle's tubular frame size and is therefore simply snapped on adjacent to the front wheel of the bicycle. The rear fender is adjusted vertically and horizontally to accommodate the overall size of the bicycle and is therefore, in similar fashion, simply snapped on adjacent to the rear wheel of the bicycle.

Additionally, more specifically, it will be noted that a preferred embodiment of the Snap on Mud Fenders for Mountain Bikes 10 comprises a front fender 20 and a rear fender 30 where in the front fender 20 is held on by a front fender clip 40 and a frame clip 41 and the rear fender 30 is held on by a seat attachment means 12.

As best illustrated in FIGS. 1 through 13, it can be shown that the front fender 20 is fixedly and removably attached to a bicycle frame 8 by the front fender clip 40 and the frame clip 41 which are fixedly attached to the front fender 20 and where the frame clip 41 includes a clothes pin control and has at least one cable slot 21 which allows it to fit over existing brake cables and the like and where the front fender clip 40 includes a pinch clip control and allows it to variably receive a frame member of the bicycle frame 8.

The rear fender 30 is supported by a post receiving member 32 and a seat receiving member 33 which are fixedly attached to one another by at least one vertical support 31.

The seat receiving member 33 is comprised of an upper surface member 28 which is further defined as an elongated formed extension protrusion of the seat receiving member 33 and where the upper surface member 28 further includes at least one rail receiving aperture 34 which matingly, variably, and removably receives a seat rail 4 of a bicycle 1.

The upper surface member 28 is further defined as having a two sides, a front, and a back spaced apart from one another and integrally and continuously constructed of a substantially flexible yet strong material such as plastic or rubber or the like and therefore defines an opening which is spring biasedly supported outwardly by a spring 37 which is retainably attached to the vertical support 31 by a spring stud 38.

Additionally, it is desirable to have a plurality of vertical supports 31 wherein each has at least one spring stud 38 oriented toward one another and matingly receiving a spring 37 with the spring 37 biasedly applying force outwardly so as to apply a separating force against each vertical support 31.

The upper surface member 28 is further comprised of a plurality of seat receiving risers 36 which extend upwardly to a common seat contact plane 35 and therefore at least one of said plurality of seat receiving risers 36 make contact with an underside of a bicycle seat 2.

The vertical support 31 further comprises a vertical support extension 39 which extendedly protrudes in a forward direction toward a front tip of the bicycle seat 2 and is essential for supporting the rear fenders weight.

The post receiving member 32 further comprises a pair of post prongs 44 which extendedly protrude forward from and are integrally attached to the rear fender 30 and together define a post aperture 43 which matingly receives a seat post 6 of the bicycle 1.

In use, when racing mountain bikes, the ground conditions can some times be wet and muddy and fenders on a bicycle 1 can some times assist the rider, helping them to go faster. In this event, it is desirable to be able to recognize these conditions ahead of the start of a race, and to be able to react quickly by installing fenders. The front fender 20 is clipped onto the bicycle's tubular frame and the rear fender is simply inserted under the bicycle seat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A snap-on mud fender for a mountain bike comprising: a rear fender wherein the rear fender is held on by a seat attachment means including a post receiving member and a seat receiving member which are fixedly attached to one another by at least one vertical support, wherein the seat receiving member is comprised of an upper surface member which is further defined as an elongated formed extension protrusion of the seat receiving member and where the upper surface member further includes at least one rail receiving aperture which is adapted for matingly and removably receiving a seat rail of a bicycle.

2. The snap-on mud fender for a mountain bike of claim 1, wherein the rear fender is supported by a post receiving member and a seat receiving member which are fixedly attached to one another by at least one vertical support.

3. The snap-on mud fender for a mountain bike of claim 2, wherein the seat receiving member is comprised of an upper surface member which is further defined as an elongated formed extension protrusion of the seat receiving member and where the upper surface member further includes at least one rail receiving aperture which is adapted to matingly and removably receive a seat rail of a bicycle.

4. The snap-on mud fender for a mountain bike of claim 3, wherein the upper surface member is further defined as having a two sides, a front, and a back spaced apart from one another and integrally and continuously constructed of a substantially flexible yet strong material and therefore defines an opening which is spring biasedly supported outwardly by a spring which is retainably attached to the vertical support by a spring stud.

5. The snap-on mud fender for a mountain bike of claim 4, wherein a plurality of vertical supports each have at least one spring stud oriented toward one another and matingly receive a spring with the spring biasedly applying force outwardly so as to apply a separating force against each vertical support.

6. The snap-on mud fender for a mountain bike of claim 5, wherein the upper surface member is further comprised of a plurality of seat receiving risers which extend upwardly to a common seat contact plane and therefore at least one of said plurality of seat receiving risers is adapted to make contact with an underside of a bicycle seat.

7. The snap-on mud fender for a mountain bike of claim 6, wherein the vertical support further comprises a vertical support extension which extendedly protrudes in a forward direction toward a front tip of the bicycle seat and is essential for supporting rear fender weight.

8. The snap-on mud fender for a mountain bike of claim 7, wherein the post receiving member further comprises a pair of post prongs which extendedly protrude forward from and are integrally attached to the rear fender and together define a post aperture which is adapted to matingly receive a seat post of the bicycle.

9. A snap-on mud fender for a mountain bike comprising:
a front fender held on by a front fender clip and a frame clip, wherein the front fender is adapted to be fixedly and removably attached to a bicycle frame by the front fender clip and the frame clip which are fixedly attached to the front fender and where the frame clip includes a clothes pin control and has at least one cable slot which allows the frame clip to fit over existing brake cables and where the front fender clip includes a pinch clip control and allows it to variably receive a bicycle frame member.

10. Snap-on mud fenders for a mountain bike comprising:
a front fender and a rear fender wherein the front fender is held on by a front fender clip and a frame clip and the rear fender is held on by a seat attachment means;
wherein the front fender is adapted to be fixedly and removably attached to a bicycle frame by the front fender clip and the frame clip which are fixedly attached to the front fender and where the frame clip includes a clothes pin control and has at least one cable slot which allows the frame clip to fit over existing brake cables and where the front fender clip includes a pinch clip control and allows it to variably receive a bicycle frame member;

wherein the rear fender is supported by a post receiving member and a seat receiving member which are fixedly attached to one another by at least one vertical support;

wherein the seat receiving member is comprised of an upper surface member which is further defined as an elongated formed extension protrusion of the seat receiving member and where the upper surface member further includes at least one rail receiving aperture which is adapted to matingly and removably receive a seat rail of a bicycle;

wherein the upper surface member is further defined as having a two sides, a front, and a back spaced apart from one another and integrally and continuously constructed of a substantially flexible yet strong material and therefore defines an opening which is spring biasedly supported outwardly by a spring which is retainably attached to the vertical support by a spring stud;

wherein a plurality of vertical supports each have at least one spring stud oriented toward one another and matingly receive a spring with the spring biasedly applying force outwardly so as to apply a separating force against each vertical support;

wherein the upper surface member is further comprised of a plurality of seat receiving risers which extend upwardly to a common seat contact plane and therefore at least one of said plurality of seat receiving risers is adapted to make contact with an underside of a bicycle seat;

wherein the vertical support further comprises a vertical support extension which extendedly protrudes in a forward direction toward a front tip of the bicycle seat and is essential for supporting rear fender weight;

wherein the post receiving member further comprises a pair of post prongs which extendedly protrude forward from and are integrally attached to the rear fender and together define a post aperture which is adapted to matingly receive a seat post of the bicycle.

* * * * *